US006886141B1

(12) United States Patent
Kunz et al.

(10) Patent No.: US 6,886,141 B1
(45) Date of Patent: Apr. 26, 2005

(54) METHOD AND SYSTEM FOR REDUCING CONGESTION IN COMPUTER NETWORKS

(75) Inventors: James A. Kunz, Plymouth, MN (US); William J Gustafson, Apple Valley, MN (US); Leonard W Haseman, Eagan, MN (US)

(73) Assignee: QLogic Corporation, Aliso Viejo, CA (US)

( * ) Notice: Subject to any disclaimer, the term of this patent is extended or adjusted under 35 U.S.C. 154(b) by 327 days.

(21) Appl. No.: 10/266,360

(22) Filed: Oct. 7, 2002

(51) Int. Cl.[7] .............................................. G06F 17/50
(52) U.S. Cl. ............................................. 716/1; 716/5
(58) Field of Search ............. 716/1, 4–5; 710/261–263; 370/229–235, 412–419

(56) References Cited

U.S. PATENT DOCUMENTS

| | | | |
|---|---|---|---|
| 4,162,375 A | 7/1979 | Schilichte | 179/15 |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 5,144,622 A | 9/1992 | Takiyasu et al. | 370/85.13 |
| 5,367,520 A | 11/1994 | Cordell | 370/60 |
| 5,598,541 A | 1/1997 | Malladi | 395/286 |
| 5,610,745 A | 3/1997 | Bennett | 359/139 |
| 5,687,172 A | 11/1997 | Cloonan et al. | 370/395 |
| 5,748,612 A | 5/1998 | Stoevhase et al. | 370/230 |
| 5,818,842 A | 10/1998 | Burwell et al. | 370/397 |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,047,323 A | 4/2000 | Krause | 709/227 |
| 6,081,512 A | 6/2000 | Muller et al. | 370/256 |
| 6,128,292 A | 10/2000 | Kim et al. | 370/356 |
| 6,160,813 A | 12/2000 | Banks et al. | 370/422 |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,411,599 B1 | 6/2002 | Blanc et al. | 370/219 |
| 6,424,658 B1 | 7/2002 | Mathur | 370/429 |
| 6,449,274 B1 | 9/2002 | Holden et al. | 370/392 |
| 6,467,008 B1 * | 10/2002 | Gentry et al. | 710/261 |
| 6,597,691 B1 | 7/2003 | Anderson et al. | 370/360 |
| 6,697,359 B1 | 2/2004 | George | 370/357 |
| 2001/0038628 A1 | 11/2001 | Ofek et al. | 370/392 |
| 2003/0016683 A1 | 1/2003 | George et al. | |
| 2003/0179748 A1 | 9/2003 | George et al. | 370/389 |
| 2004/0013092 A1 | 1/2004 | Betker et al. | |
| 2004/0013125 A1 | 1/2004 | Betker et al. | |
| 2004/0028038 A1 | 2/2004 | Anderson et al. | |
| 2004/0141521 A1 | 7/2004 | George | 370/463 |

FOREIGN PATENT DOCUMENTS

| | | | |
|---|---|---|---|
| EP | 0649098 | 9/1994 | G06F/15/16 |
| EP | 0856969 | 1/1998 | H04L/12/00 |
| WO | WO-98/36537 | 8/1998 | H04L/12/44 |

OTHER PUBLICATIONS

U.S. Appl. No. 10/241,153, filed Sep. 11, 2002, Zone Management In A Multi–Module Fibre Channel Switch.
U.S. Appl. No. 10/263,858, filed Oct. 3, 2002, Method And System For Using Distributed Name Servers In Multi–Module Fibre Channel Switching.

(Continued)

*Primary Examiner*—Vuthe Siek
*Assistant Examiner*—Paul Dinh
(74) *Attorney, Agent, or Firm*—Tejinder Singh; Klein, O'Neill & Singh, LLP

(57) ABSTRACT

A system and method for discarding expired network data packets is provided. A time stamp value is assigned to data packets that are received in a data packet queue, wherein the time stamp value is based on a counter value. The time stamp value is extracted after the counter value changes or a new data packet is received at the head of the data packet queue. The extracted time stamp value is then compared with the counter value. Data packets with expired timer value are discarded.

8 Claims, 6 Drawing Sheets

OTHER PUBLICATIONS

U.S. Appl. No. 10/212,425, filed Aug. 5, 2002, Method And System For Flexible Routing In A Fibre Channel System.
U.S. Appl. No. 10/302,149, filed Nov. 22, 2002, Method And System For Controlling Packet Flow In Networks.
U.S. Appl. No. 10/894,579, filed Jul. 20, 2004, Method and System for Managing Traffic in Fibre Channel Switches.
U.S. Appl. No. 10/894,546, filed Jul. 20, 2004, Method and System for Routing and Filtering Network Data Packets in Fibre Channel Systems.
U.S. Appl. No. 10/894,827, filed Jul. 20, 2004, Method and System for Selecting Virtual Lanes in Fibre Channel Switches.
U.S. Appl. No. 10/894,597, filed Jul. 20, 2004, Programmable Pseudo Virtual Lanes for Fibre Channel Systems.
U.S. Appl. No. 10/894,595, filed Jul. 20, 2004, Method and System for Reducing Latency and Congestion in Fibre Channel Switches.
U.S. Appl. No. 10/664,548, filed Sep. 19, 2003, Buffer to Buffer Credit Recovery for In–Line Fibre Channel Credit Extension Devices.
U.S. Appl. No. 10/895,175, filed Jul. 20, 2004, Method and System for Detecting Congestion and Over Subscription in a Fibre Channel Network.
U.S. Appl. No. 10/894,492, filed Jul. 20, 2004, LUN Based Hard Zoning in Fibre Channel Switches.
U.S. Appl. No. 10/894,587, filed Jul. 20, 2004, Multi Speed Cut Through Operation in Fibre Channel Switches.
U.S. Appl. No. 10/894,726, filed Jul. 20, 2004, Method and System for Improving Bandwidth & Reducing Idles in Fibre Channel Switches.
U.S. Appl. No. 10/894/629, filed Jul. 20, 2004, Method and System for Routing Fibre Channel Systems.
U.S. Appl. No. 10/894,491, filed Jul. 20, 2004, Method and System for Keeping a Fibre Channel Arbitrated Loop Open During Frame Gaps.
U.S. Appl. No. 10/894,536, filed Jul. 20, 2004, Method And System For Congestion Control Based On Optimum Bandwidth Allocation In A Fibre Channel Switch.
U.S. Appl. No. 10/894,627, filed Jul. 20, 2004, Method and System for Programmable Data Dependent Network Routing.
U.S. Appl. No. 10/719,077, filed Nov. 21, 2003, Method and System for Monitoring Events in Storage Area Networks.
U.S. Appl. No. 10/894,689, filed Jul. 20, 2004, Method and System for Power Control of Fibre Channel Switches.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method And System For Inexpensive And Non–Disruptive Data Capture In Networks.
U.S. Appl. No. 10/889,337, filed Jul. 12, 2004, Method And System For Minimizing Disruption In Common–Access Networks.
U.S. Appl. No. 10/889,259, filed Jul. 12, 2004, Method And Apparatus For Detecting And Removing Orphaned Primitives In A Fibre Channel Network.
U.S. Appl. No. 10/889,267, filed Jul. 12, 2004, Method And System For Fibre Channel Arbitrated Loop Acceleration.
U.S. Appl. No. 10/889,551, filed Jul. 12, 2004, Method And Apparatus For Testing Loop Pathway Integrity In A Fibre Channel Arbitrated Loop.
U.S. Appl. No. 10/889/256, filed Jul. 12, 2004, Method And Apparatus For Accelerating Receive–Modify–Send Frames In A Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method And Apparatus For Improving Buffer Utilization In Communication Networks.
U.S. Appl. No. 10/894,597, filed Jul. 20, 2004, Method And System For Using Extended Fabric Features With Fibre Channel Switch Elements.
U.S. Appl. No. 10/894,978, filed Jul. 20, 2004, Method And System For Programmable Data Dependent.
U.S. Appl. No. 10/894,917, filed Jul. 20, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method And System For Congestion Control In A Fibre Channel Switch.
Clark, Tom, "Zoning for Fibre Channel Fabrics", Vixel Corporation Paper—XP002185194., (Aug. 1999), pp 1–6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp 269–274.
Martin, Charles R., "Fabric Interconnection of fibre channel standard nodes", Proceedings of the SPIE, (Sep. 8, 1992), pp 65–71.
Yoshida, Hu, "LUN Security Considerations for Storage Area Networks," Hitachi Data Systems Paper—XP 002185193 (1999), pp 1–7.
Claudio DeSanti, "Virtual Fabrics Switch Support"; VF Switch Support, T11/04–395v2. Sep. 2004, pp 1–15.
Pelissier et al, "Inter–Fabric Routing", dated Jul. 30, 2004, Inter Fabric Routing (04–520v0); pp 1–31.
DeSanti et al, "Virtual Fabrics"; Virtual Fabrics, T11/03–352v0, May 2003; pp 1–4.
Martin et al , "Virtual Channel Architecture", Presentation by Brocade to T11/03–369V0 dated Jun. 2, 2003.

* cited by examiner

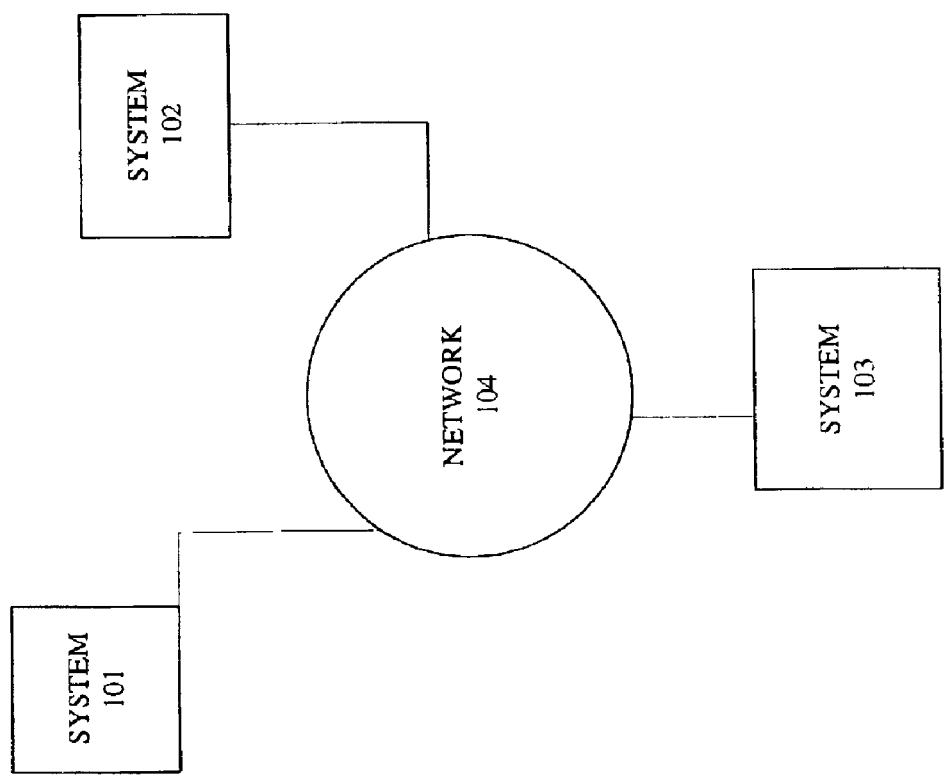

METHOD AND SYSTEM FOR REDUCING CONGESTION IN COMPUTER NETWORKS

BACKGROUND

1. Field of the Invention

The present invention relates to computer networks, and more particularly to reducing congestion in computer networks.

2. Background of the Invention

Computer networks are used in every facet of today's business and personal life. Whether it involves sending electronic mail or accessing remote data, a computer network is used to accomplish various tasks.

In a typical computer network, data packets enter a data path serially, one after another, and then data packets are processed individually. The number of data of data packets received in a data queue is based on the size of the queue, which can be programmed by a user. Hence, in some instances a large number of data packets may be received in a data packet queue. If in-order data packet processing is required, then the packet at the beginning ("head packet") must be processed first and packets following the head packet must wait for processing. This results in packet congestion. If the head packet never gets processed, then the data path stalls and hence must be re-set. This results in inefficiency and can be very expensive for businesses.

Computer networks today cannot afford to have congestion and stall problems. Conventional data packet techniques do not solve the foregoing congestion and stalling problems. Conventional techniques require separate memory buffers to store data packets. This increases cost and makes the process inefficient since additional operations are needed to write/read data packets from the memory buffers.

Therefore, what is needed is a process and system in a network for discarding data packets that have been received for a certain period.

SUMMARY OF THE INVENTION

In one aspect of the present invention, a system for discarding expired network data packets is provided. The system includes a counter for assigning a time stamp value for data packets received in a data packet queue; and a comparator for comparing an extracted time stamp value with a counter value generated by the counter. The time stamp value may be based on the upper two bits of the counter value. The counter value may include a base increment value and a value generated by a first programmable register.

The system also includes a second register for storing the extracted time stamp value.

The comparator checks for data packet expiration if the counter value has changed or if the second register is loaded with a new data packet at the head of the data packet queue.

In another aspect of the present invention, a method for discarding expired network data packets is provided. The method including assigning a time stamp value to data packets that are received in a data packet queue, wherein the time stamp value is based on a counter value; extracting the time stamp value after the counter value changes or a new data packet is received at the head of the data packet queue; comparing the extracted time stamp value with the counter value; and discarding a data packet if the time stamp value has expired.

In one aspect of the present invention, separate memory buffers or timestamp headers are not required to determine when a packet has expired.

In another aspect of the present invention, the time stamp and expiration value may be programmed to meet the granularity needs of different networks.

In yet another aspect of the present invention, serial data packet reception is streamlined and data packet congestion is avoided.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1A is a block diagram showing plural computer systems operationally coupled to a network;

DETAILED DESCRIPTION OF THE PREFERRED EMBODIMENTS

FIG. 1A is a block diagram showing plural computing systems 101–103 operationally coupled to a network 104. In one aspect of the present invention, network 104 may operate using multiple protocols, for example, TCP/IP, fiber channel or any other protocol.

Figure 1B:
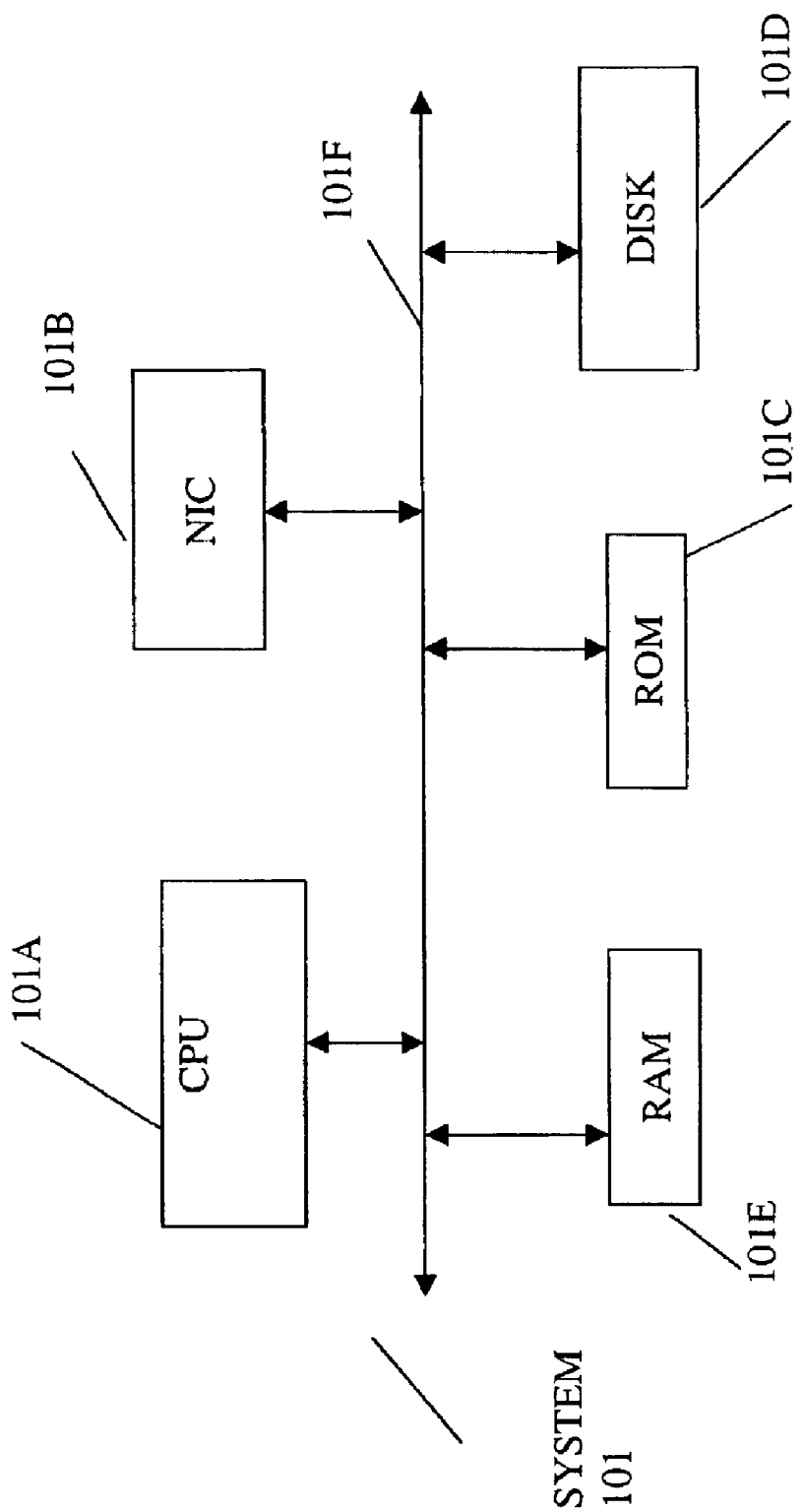
FIG. 1B is a block diagram of the computing systems shown in FIG. 1A.

FIG. 1B is a block diagram showing the internal functional architecture of a computing system (e.g. 101). As shown in FIG. 1B, computer 101 includes a central processing unit ("CPU") 101A for executing computer-executable process steps and interfaces with a computer bus 101F. CPU 101A may be a Pentium™ class processor sold and marketed by Intel Corp.™ or any other processor.

Among other components, computing system 101 includes a network interface card ("NIC") 101B, a rotating disk 101D, random access memory ("RAM") 101E and read only memory ("ROM") 101C.

NIC 101B provides system 101 with connectivity to network 104. NIC 101B may have its own processor or dedicated chip to conduct specific operations.

Disk 101D stores operating system program files, application program files, and other files. Some of these files are stored on disk 101D using an installation program. For example, CPU 101A executes computer-executable process steps of an installation program so that CPU 101A can properly execute the application program.

A random access main memory ("RAM") 101E also interfaces to computer bus 101F to provide CPU 101A with access to memory storage. When executing stored computer-executable process steps from disk 101D (or other storage media such as a floppy disk 16 or via network connection 104), CPU 101A stores and executes the process steps out of RAM 101E.

Read only memory ("ROM") 101C is provided to store invariant instruction sequences such as start-up instruction sequences or basic input/output operating system (BIOS) sequences for operation of keyboards etc. (not shown).

Figure 1C:
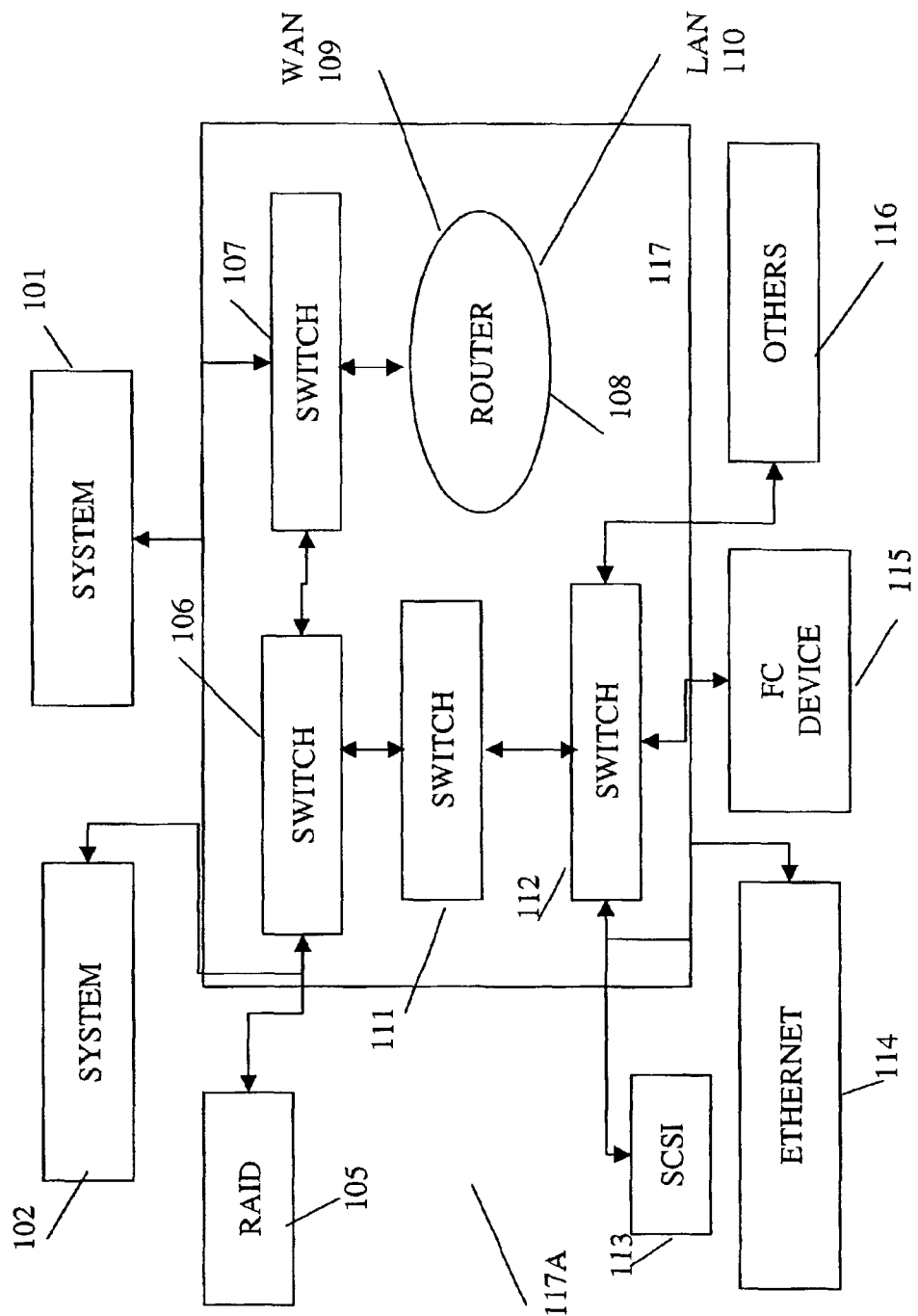
FIG. 1C is a block digram showing a network using the INFINIBAND standard, according to one aspect of the present invention.

FIG. 1C shows a block diagram of plural computing devices operationally coupled using the Infiniband architecture as described in the Infiniband standard specification, published by the Infiniband Trade Association.

FIG. 1C shows system 117A with a fabric 117. Fabric 117 includes plural switches 106, 107, 111 and 112. Fabric 117 also includes a router 108 that is coupled to a wide area network 109 and local area network 110. It is noteworthy that network 104 may include both WAN 109 and LAN 110.

Switch 106 is operationally coupled to a RAID storage system 105 and system 102, while system 101 may be operationally coupled to switch 107.

Switch 112 may be coupled to a small computer system interface ("SCSI") SCSI port 113 that is coupled to SCSI based devices. Switch 112 may also be coupled to Ethernet 114, fiber channel device (s) 115 and other device(s) 116.

Figure 1D:
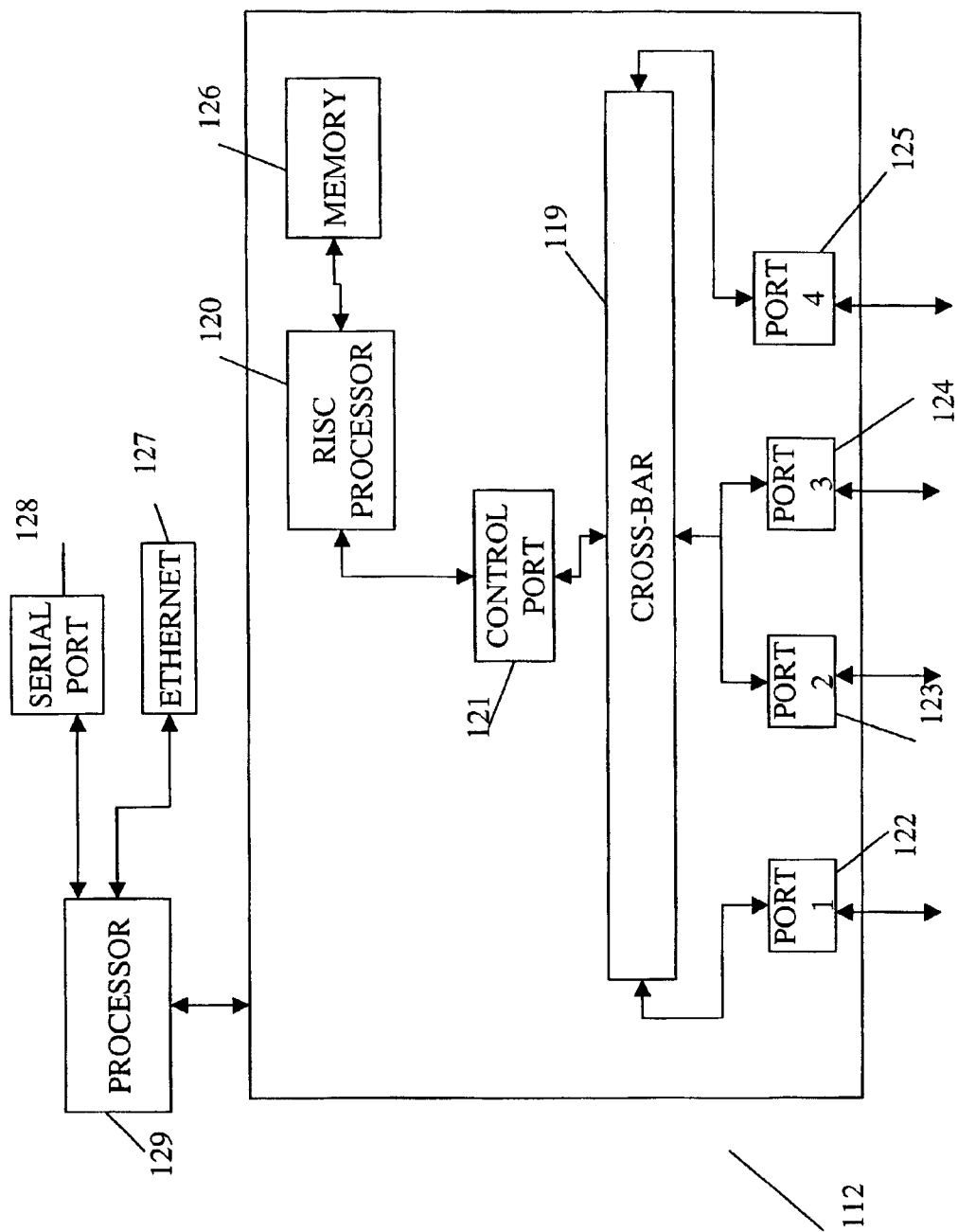
FIG. 1D is a block diagram of a switch using the system, according to one aspect of the present invention.

FIG. 1D shows a block diagram of switch 112 that includes a processor 120 which is operationally coupled to plural ports 122, 123, 124 and 125 via a control port 121 and cross-bar 119. In one aspect of the present invention, processor 120 may be a reduced instruction set computer (RISC) type microprocessor. Ports 122–125 may be similar to ports 113–116, respectively.

Switch 112 may be coupled to a processor 129 that is coupled to Ethernet 127 and serial port 128. In one aspect of the present invention, processor 129 may be similar to CPU 101A in system 101.

Figure 2:
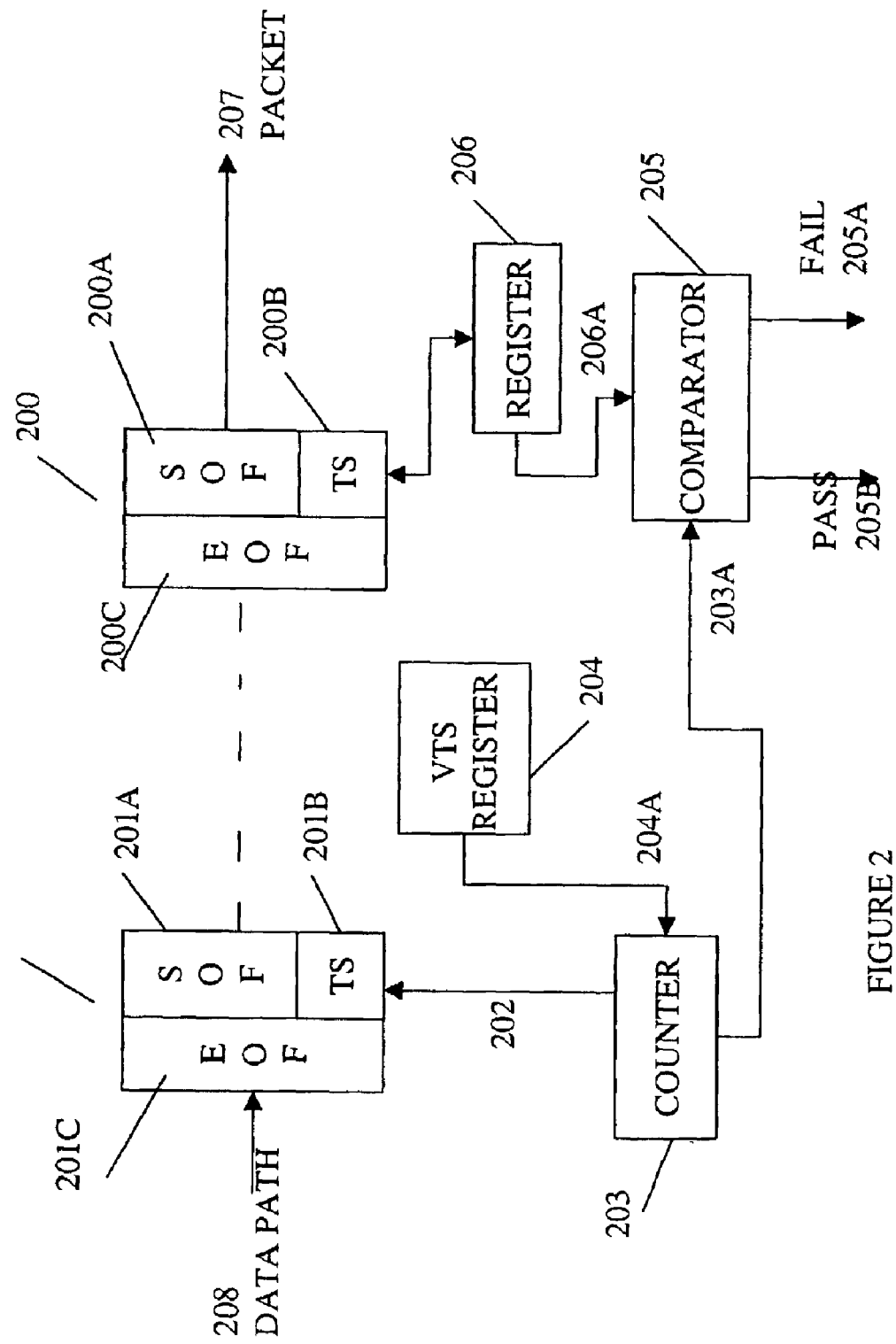
FIG. 2 is a block diagram of a system according to one aspect of the present invention.

FIG. 2 is a block diagram of a system 200 that reduces data packet congestion in a network data path 208. Network data path 208 shows data packets received from a device or the network into a switch (112).

Network data path 208 shows data packets 200 and 201 moving in direction 208. Data packet 200 includes a start of frame header 200A and end of frame 200C. Similarly, data packet 201 includes a start of frame header 201A and end of frame 201C.

When a data packet (e.g.) 200 is received, a counter 203 tags a time stamp 200B to the data packet. Typically, the time stamp code 200B is embedded in the first word of data packet 200. Before data packet 200 is processed or while waiting at the head of a packet queue 208, time stamp code 200B value is extracted by register 206. As discussed below, comparator 205 compares the extracted value 206A with counter 203 value (203A).

Counter 203 value 203A may be based on a base increment value and programmable variable time stamp (VTS) register 204 value 204A or any other command from RISC processor 120. This allows VTS register 204 to program the time stamp value 202 using counter 203.

Comparator 205 checks if the timer for data packets has expired whenever counter 203 value changes or register 206 is re-loaded (i.e. if new data packets arrive at the head of queue 208). Comparator 205 compares value 206A with counter value 203A to determine if the timer for a packet has expired. Based on the comparison, Comparator 205 generates a pass signal 205B if the timer has not expired, or fail signal 205A, if the timer expired.

An example of how the expiration value is determined is provided below:
VTS Register 204 value=VTS
Base Increment for VTS register 204: M milli-seconds
Expiration value: $2M*2^{VTS}+X\%-Y\%$ In one aspect of the present invention, the following values may be used:
VTS=8, M=2, X=1% and Y=51%, and expiration value is between 250 ms to 500 ms.

The foregoing illustration is an example to show how the components of FIG. 2 will determine if a packet has expired. The example is only an illustration and is not intended to limit the adaptive aspects of the present invention.

Figure 3:
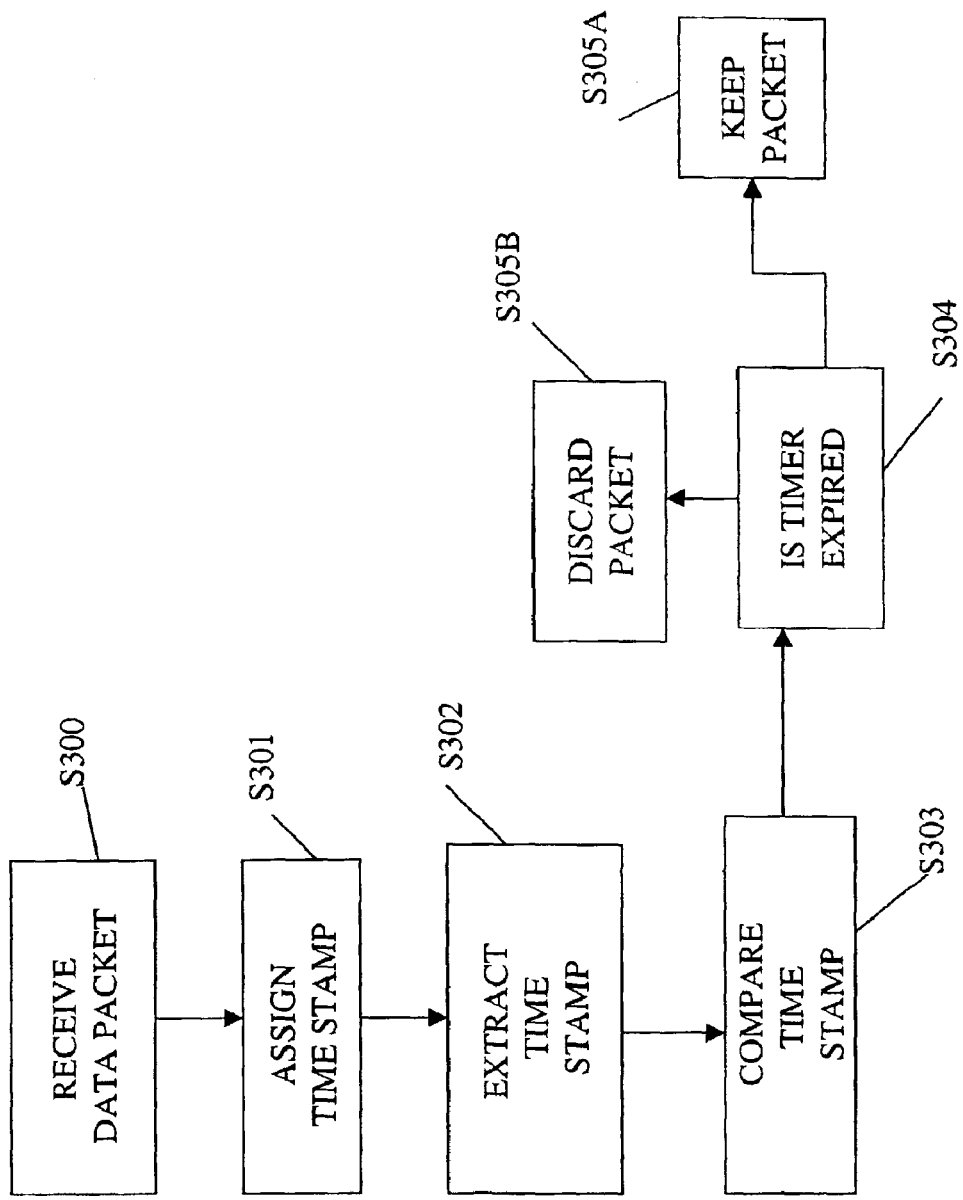
FIG. 3 is a flow diagram of executable process steps for reducing network data packet congestion, according to one aspect of the present invention.

FIG. 3 shows a flow diagram of executable process steps that allows efficient processing of data packets.

Turning in detail to FIG. 3, in step S300 data packets are received from the network. Data packets flow serially in data path 208.

In step S301, a time stamp is assigned for a data packet. In one aspect of the present invention, the time stamp is embedded in the start of frame header of the data packet (e.g. 201B). Time stamp 202 is based on VTS register value 204 and may be 2 bits.

In step S302, the time stamp value is extracted. The time stamp value is extracted and sent to register 206.

In step S303, the time stamp value 206A is compared to counter value 203A. Counter value 203A may be based on VTS register 204 output 204A.

In step S304, the process determines if the timer for a data packet has expired. This is determined by the comparison in step S303.

In step S305B the packet is discarded if the timer has expired, or kept in the queue, in step S305A, if the timer has not expired.

In one aspect of the present invention, separate memory, buffers or timestamp headers are not required to determine when a packet has expired.

In another aspect of the present invention, the time stamp and expiration value may be programmed to meet the needs of different networks.

In yet another aspect of the present invention, serial data packet reception is streamlined and data packet congestion is avoided.

Although the present invention has been described with reference to specific embodiments, these embodiments are illustrative only and not limiting. Many other applications and embodiments of the present invention will be apparent in light of this disclosure and the following claims.

What is claimed is:

1. A system for discarding expired network data packets, comprising:
   a counter for assigning a time stamp value to data packets received in a data packet queue; and
   a comparator for comparing an extracted time stamp value and a counter value generated by the counter, wherein the time stamp value is based on upper two bits of the counter value generated by the counter and wherein the time stamp value is extracted after the counter value changes or a new data packet is received at a head of the data packet queue.

2. The system of claim 1, wherein the counter value includes a base increment value.

3. The system of claim 1, wherein the counter value includes a value generated by a first programmable register.

4. The system of claim 1, further comprising:
   a second register for storing the extracted time stamp value.

5. The system of claim 4, wherein the comparator checks for data packet expiration if the counter value has changed or if the second register is loaded with a new data packet at a head of the data packet queue.

6. A method for discarding expired network data packets, comprising:
   assigning a time stamp value to data packets that are received in a data packet queue, wherein the time stamp value is based on upper two bits of a counter value;
   extracting the time stamp value after the counter value changes or a new data packet is received at a head of the data packet queue;
   comparing the extracted time stamp value with the counter value; and
   discarding a data packet if the time stamp value has expired.

7. The method of claim 6, wherein the counter value is based on a based increment value and a programmed register value.

8. A method for discarding expired network data packets, comprising:
   assigning a time stamp value to data packets that are received in a data packet queue, wherein the time stamp value is based on upper two bits of a counter value;
   extracting the time stamp value after the counter value changes or a new data packet is received at a head of the data packet queue;
   comparing the extracted time stamp value with the counter value; and
   discarding a data packet if the time stamp value has expired; wherein the upper two bits of the counter value are compared to the extracted time stamp value.

* * * * *